(12) United States Patent
Peterson et al.

(10) Patent No.: US 8,946,954 B2
(45) Date of Patent: Feb. 3, 2015

(54) INTEGRATED DIRECT DRIVE MOTOR AND CONTROL

(75) Inventors: Gregory A. Peterson, South Barrington, IL (US); Daniel E. Hilton, St. Louis, MO (US); Michael W. Major, Moro, IL (US)

(73) Assignee: Nidec Motor Corporation, St. Louis, MO (US)

( * ) Notice: Subject to any disclaimer, the term of this patent is extended or adjusted under 35 U.S.C. 154(b) by 133 days.

(21) Appl. No.: 13/451,786

(22) Filed: Apr. 20, 2012

(65) Prior Publication Data

US 2013/0278094 A1    Oct. 24, 2013

(51) Int. Cl.
*H02K 5/22* (2006.01)
*H02K 5/18* (2006.01)

(52) U.S. Cl.
USPC .................. 310/67 R; 310/194; 310/68 R (58) Field of Classification Search
USPC ............ 310/67 R, 216.047, 254.1, 269, 68 D, 310/194
See application file for complete search history.

(56) References Cited

U.S. PATENT DOCUMENTS

| | | | | |
|---|---|---|---|---|
| 5,825,108 | A * | 10/1998 | De Filippis | 310/67 R |
| 6,400,059 | B1 * | 6/2002 | Hsu | 310/254.1 |
| 6,992,419 | B2 | 1/2006 | Kim et al. | |
| 7,356,906 | B2 | 4/2008 | Kim et al. | |
| 7,443,074 | B2 | 10/2008 | Kim et al. | |
| 7,603,877 | B2 * | 10/2009 | Marioni | 68/12.06 |
| 7,652,406 | B2 | 1/2010 | Kim et al. | |
| 7,906,879 | B2 * | 3/2011 | Jang et al. | 310/71 |

* cited by examiner

*Primary Examiner* — Tran Nguyen
*Assistant Examiner* — Leda Pham
(74) *Attorney, Agent, or Firm* — Hovey Williams LLP (57) ABSTRACT

An outer rotor motor is provided for use in a machine. The motor includes a rotor and a stator. A control board assembly configured to control at least one operational characteristic of the motor is mounted at least in part radially inside the stator.

26 Claims, 6 Drawing Sheets

INTEGRATED DIRECT DRIVE MOTOR AND CONTROL

BACKGROUND OF THE INVENTION

1. Field of the Invention

The present invention relates generally to an electric motor for use in a machine. More specifically, the present invention concerns a direct drive motor having an integral control system.

2. Discussion of the Prior Art

Those of ordinary skill in the art will appreciate that electric motors are often used in home appliances such as dishwashers and washing machines. In a washing machine, for instance, an electric motor may be used to cause rotation of the washer basket to agitate the clothing contained therein. Although a variety of motor component arrangements may be used, one known embodiment of an electric motor includes a stator positioned at least in part radially inside a rotor. An electric motor having such a configuration is commonly referred to as an outer rotor motor or external rotor motor, although other names may be used. In the case of a washing machine having an electric motor of this sort, the rotor is typically coupled to the washer basket, whereas the stator is fixed to a tub mounting hub that is coupled to a stationary washer outer tub. To avoid potential electrical shock of the user, the stator is mounted in such a manner that it is electrically isolated from the tub.

The stator of an outer rotor motor typically includes a core and a plurality of coils. Conventionally, the core takes a generally toroidal form and is composed of a ferromagnetic metal such as iron or steel. The core typically includes a plurality of teeth projecting radially outwardly and defining slots therebetween. The coils are formed by the winding of electrically conductive wire multiple times around each tooth to at least partially fill the slots. Electrical insulation is typically provided between the teeth and the coils.

Mounting of the outer rotor motor in the machine is conventionally accomplished through alignment of openings in the stator core with corresponding openings in the tub mounting hub, followed by insertion of a fastener through each aligned pair of openings. Such an approach is often inconvenient and expensive. For instance, traditional outer rotor motors are limited to a specific mounting arrangement incorporated into the core fabrication process. To use a conventional core in a different application requiring a different mounting arrangement, the core fabrication process must be varied (e.g., the lamination die for a laminated stator core must be re-machined). Furthermore, the metal core must be large enough to house the mounting openings, making the core heavy and expensive. Even further, the increased number of components in the machine-motor system, including fasteners such as bolts or screws, slows the assembly process and increases the risk that a component necessary for assembly will be misplaced.

A motor drive or control board assembly is typically provided to control the electric motor. Conventionally, the control board assembly is located remotely from the motor and is connected thereto by a wiring harness. The control board assembly is additionally connected by lead wires to a machine control interface that is typically located on the front of the machine for ease of user access. The extensive wiring required for such a configuration adds to the expense of the machine and also increases the potential for electromagnetic interference problems to arise. The multiple connections required increase the risk that a faulty connection will hinder performance. Furthermore, since the standard control board assembly position is in a water-prone area, a dripshield housing must typically be provided to protect the control board assembly from encroachment of water or other liquids. Finally, the high number of components and assembly steps increases the time required for assembly and, in turn, the total cost of the machine.

SUMMARY

According to one aspect of the present invention, an outer rotor motor is provided for use in a machine. The motor comprises a rotor rotatable about an axis and a stator spaced at least in part radially inside the rotor. The stator includes a generally toroidal core and wiring wound around the core such that the stator takes a generally toroidal form. Moreover, the motor includes a control board assembly mounted at least in part radially inside the stator to be at least substantially circumscribed by the stator.

Among other things, the provision of an outer rotor motor in which a control board assembly is mounted at least in part radially inside the stator enables a reduction in the length of the wiring harness conventionally required between the control board assembly and the motor. The harness length reduction not only leads to cost saving but also to potentially better signal quality. Such placement of the control board assembly also allows a reduction in the length of the lead wires conventionally provided between the machine control interface and the control board assembly, again leading to cost savings and potentially better signal quality. In addition, such placement allows the elimination of a dripshield housing that might otherwise be required for protection from water. Furthermore, with regard to commercial considerations, integration of the control board assembly and the motor advantageously allows for packaging and sale of the motor and control board as a single, inclusive unit rather than as separate units.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
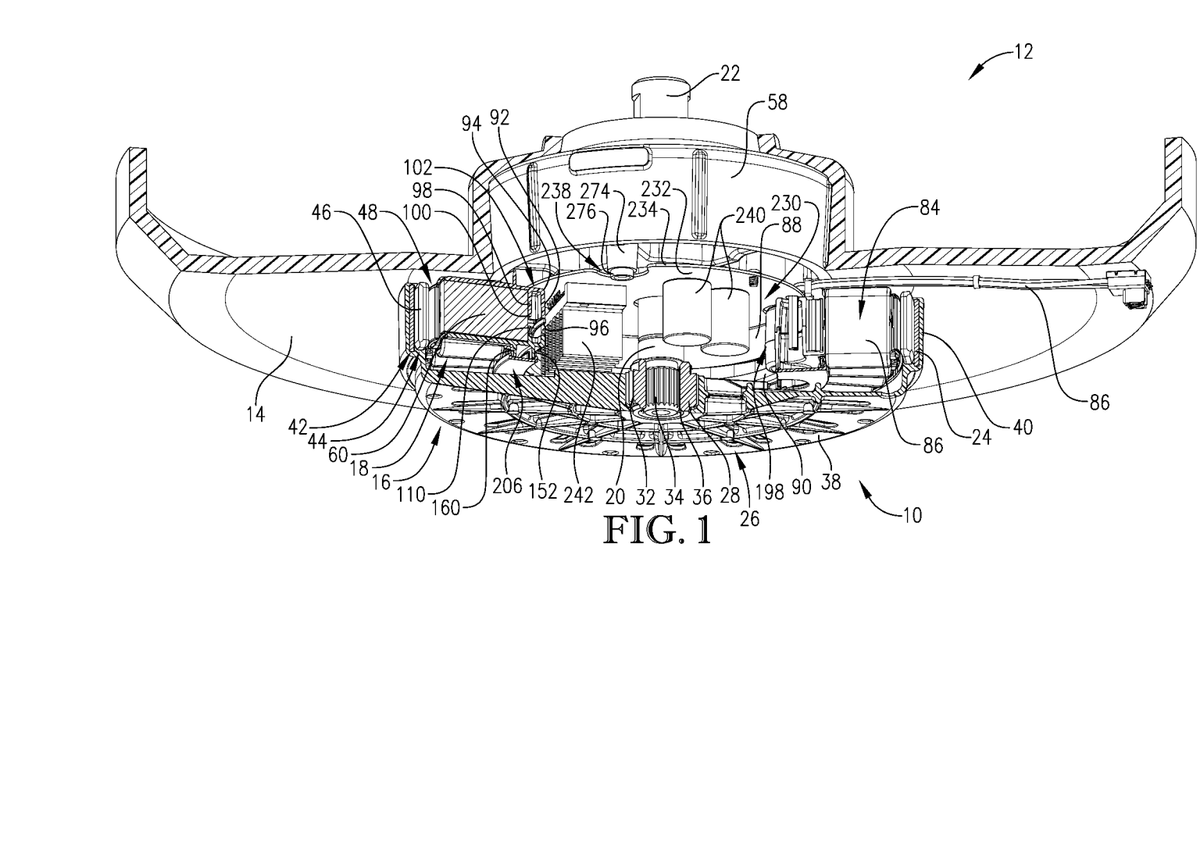
FIG. 1 is a partial sectional bottom perspective view of a portion of a machine constructed in accordance with the principles of a preferred embodiment of the present invention, depicting a portion of a washing machine and an outer rotor electric motor.
Figure 2:
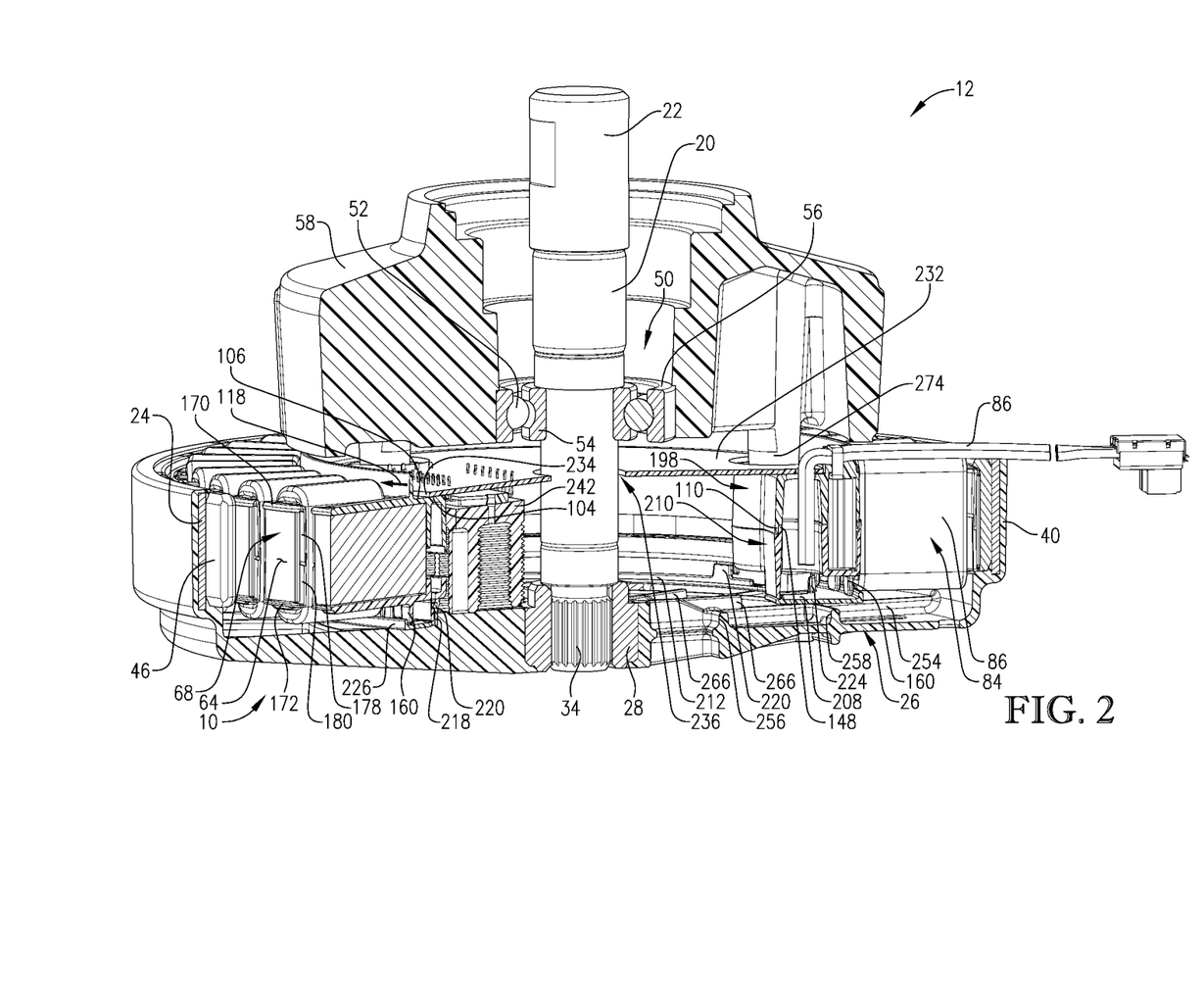
FIG. 2 is an enlarged, partial sectional top perspective view of a portion of the machine of FIG. 1, particularly depicting the interactions between various components of the machine.

With initial reference to FIGS. 1 and 2, an electric motor 10 constructed in accordance with a preferred embodiment of the present invention is depicted for use in a machine 12. The particular machine depicted in FIGS. 1 and 2 is a washing mashing having a stationary tub 14 (not shown in FIG. 2) and a rotatable washer or agitator basket (not shown). However, a variety of machines, including but not limited to washing machines, fans, generators, and exercise equipment such as bicycles, are suitable for use with the present invention.

Figure 6:
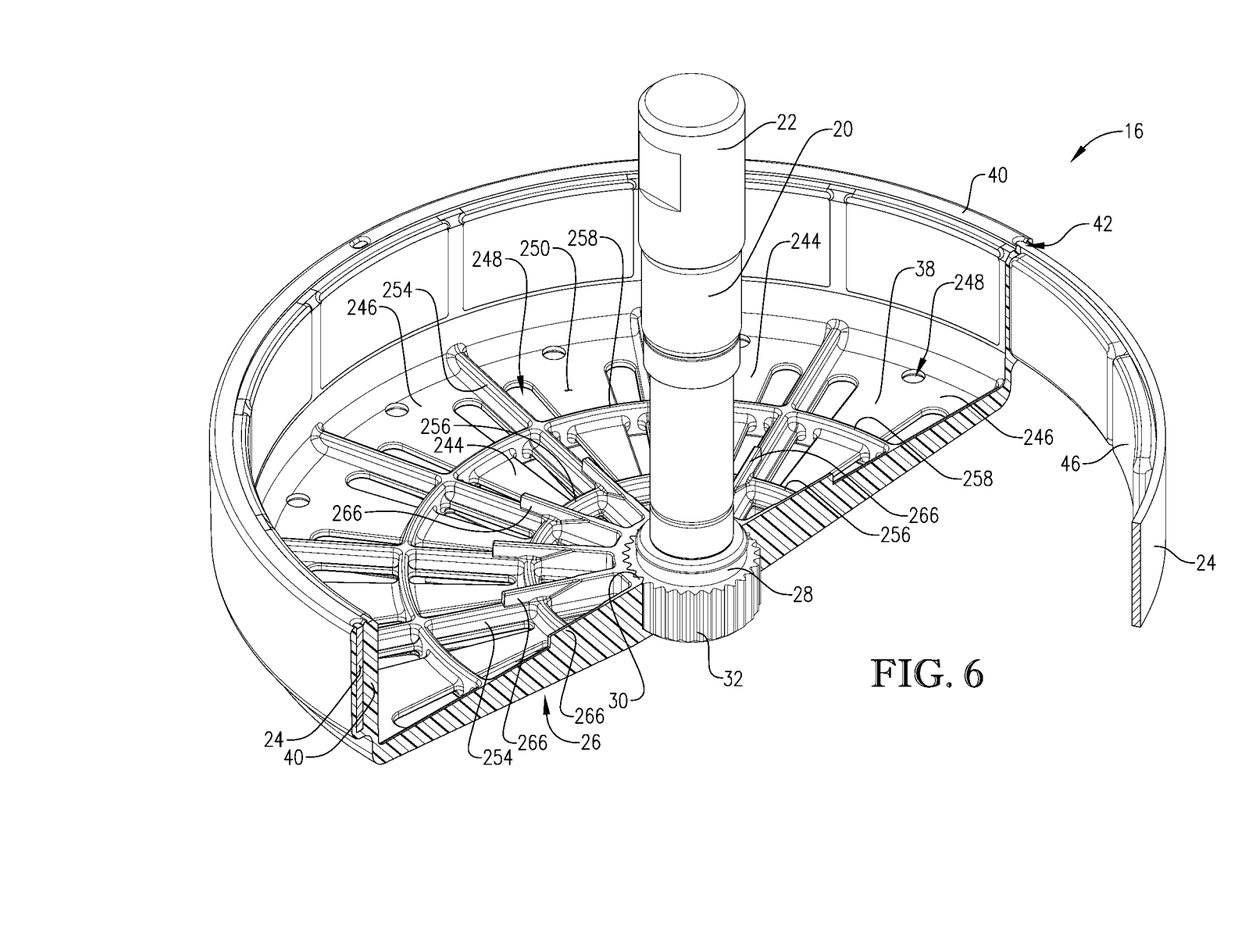
FIG. 6 is partial sectional top perspective view of the rotor of the machine of FIGS. 1-6, particularly illustrating the fan blades formed on the rotor can.

In a preferred embodiment, the motor 10 is an outer rotor motor that broadly includes a rotor 16 and a stator 18 spaced partially inside the rotor 16, as is customary. As best shown in FIGS. 1, 2, and 6, the rotor 16 includes a rotatable shaft 20 connectable to the rotatable basket of the machine 12 at a machine connection end 22. Preferably, the axis of rotation of the rotor 16 is coaxial with that of the rotatable shaft 20, with the shared axis being further coaxial with the axis of rotational symmetry of the tub 14. It is permissible, however, for offset axes to be defined.

The rotor 16 also includes a backing ring 24 located radially outwardly from the shaft 20 to circumscribe the stator 18 in a spaced relationship. Preferably, the backing ring 24 comprises a sheet of metal wrapped five times around the outer circumference of the stator 18 so that the backing ring 24 includes five layers. (For the sake of clarity, individual layers of the backing ring 24 are not shown) Preferably, the metal comprises iron. However, a ring comprising a different number of layers or a single layer and/or comprising one or more of a variety of materials falls within the scope of the present invention. In the preferred embodiment, the backing ring 24 is positioned within a rotor can 26 that connects the backing ring 24 to a central coupler 28. In the illustrated embodiment, the rotor can 26 has a splined inner circumferential surface 30 that meshes with the outer splines 32 on the coupler 28, although other suitable means may be incorporated to rotationally fix the components to one another. The central coupler 28 is fixed to the shaft 20 so that the shaft 20, the coupler 28, the rotor can 26, and the backing ring 24 all rotate together. In the illustrated embodiment, the shaft 20 has a splined end 34 that meshes with the inner splines 36 on the coupler 28, although other suitable means may be incorporated to rotationally fix the components to one another.

Preferably, the rotor can 26 includes a spoked base 38 projecting radially from the coupler 28 and a circumferentially extending support wall 40 that projects axially from the base 38. The support wall 40 and the base 38 cooperate to define a circumferentially extending channel 42 that houses the backing ring 24. In a preferred embodiment, the rotor can 26 also defines a plurality of circumferentially spaced slots 44 positioned radially inwardly of the channel 42. The slots 44 house a plurality of permanent magnets 46 shaped such that a circumferential space 48 between the magnets 46 and the stator 18 is retained. However, a variety of means by which the backing ring 24 and the magnets 46 are appropriately positioned fall within the ambit of the present invention. Preferably, the rotor can 26 is formed of plastic, although the rotor can 26 may alternatively be formed of one or more of a variety of materials within the scope of the present invention. Several other features of a preferred embodiment of the rotor can 26 will be discussed in more detail below.

Figure 3:
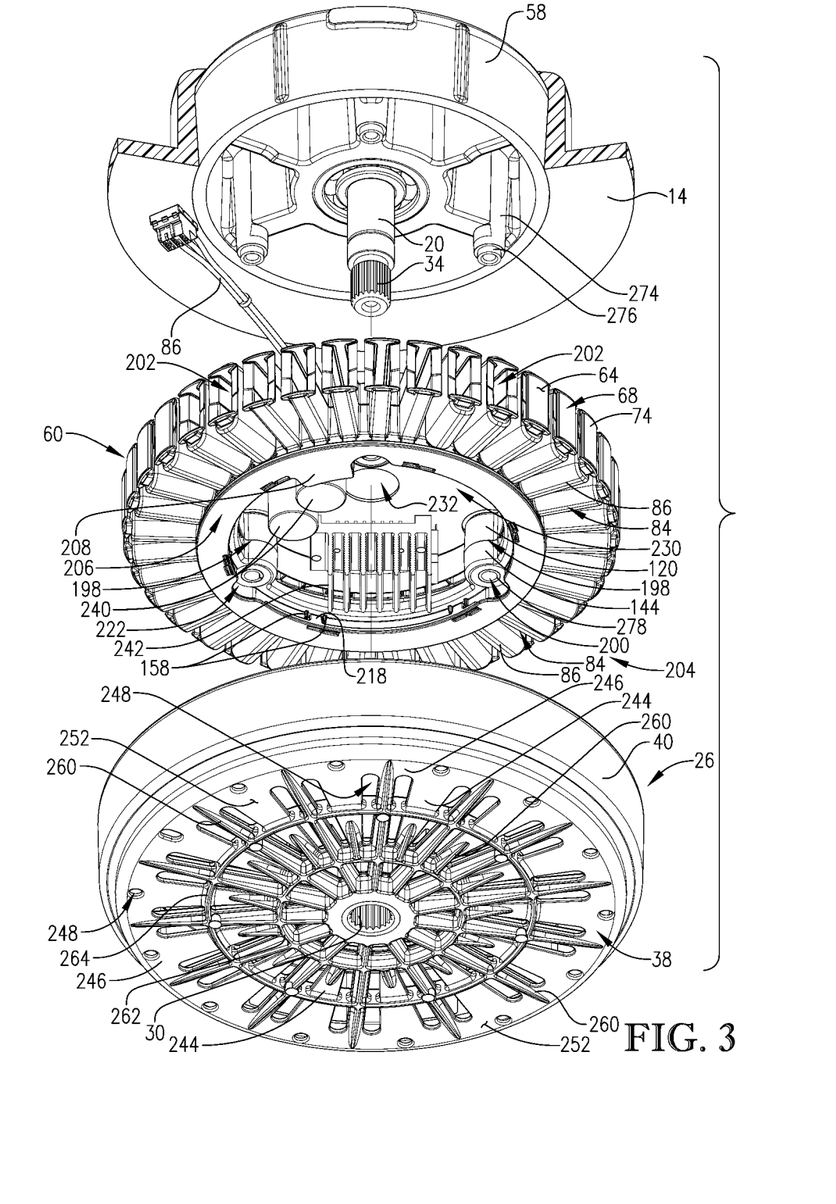
FIG. 3 is an exploded, partial sectional bottom perspective view of a portion of the machine of FIGS. 1 and 2, particularly depicting the tub mounting means, the stator assembly, and the control board assembly.

Preferably, the rotor 16 is rotationally supported on the tub 14 by a bearing assembly 50. As best shown in FIGS. 2 and 3, the bearing assembly 50 includes a plurality of ball bearings 52 disposed between an inner race 54 and an outer race 56, although a different bearing type or an entirely different rotation isolation mechanism could be used to similar effect without departing from the spirit of the present invention. Preferably, the bearing assembly 50 is associated with a tub mounting hub 58, with the tub 14 being fixed to the tub mounting hub 58 (as shown in FIGS. 1 and 3) by any means suitable for preventing rotation therebetween.

Figure 4:
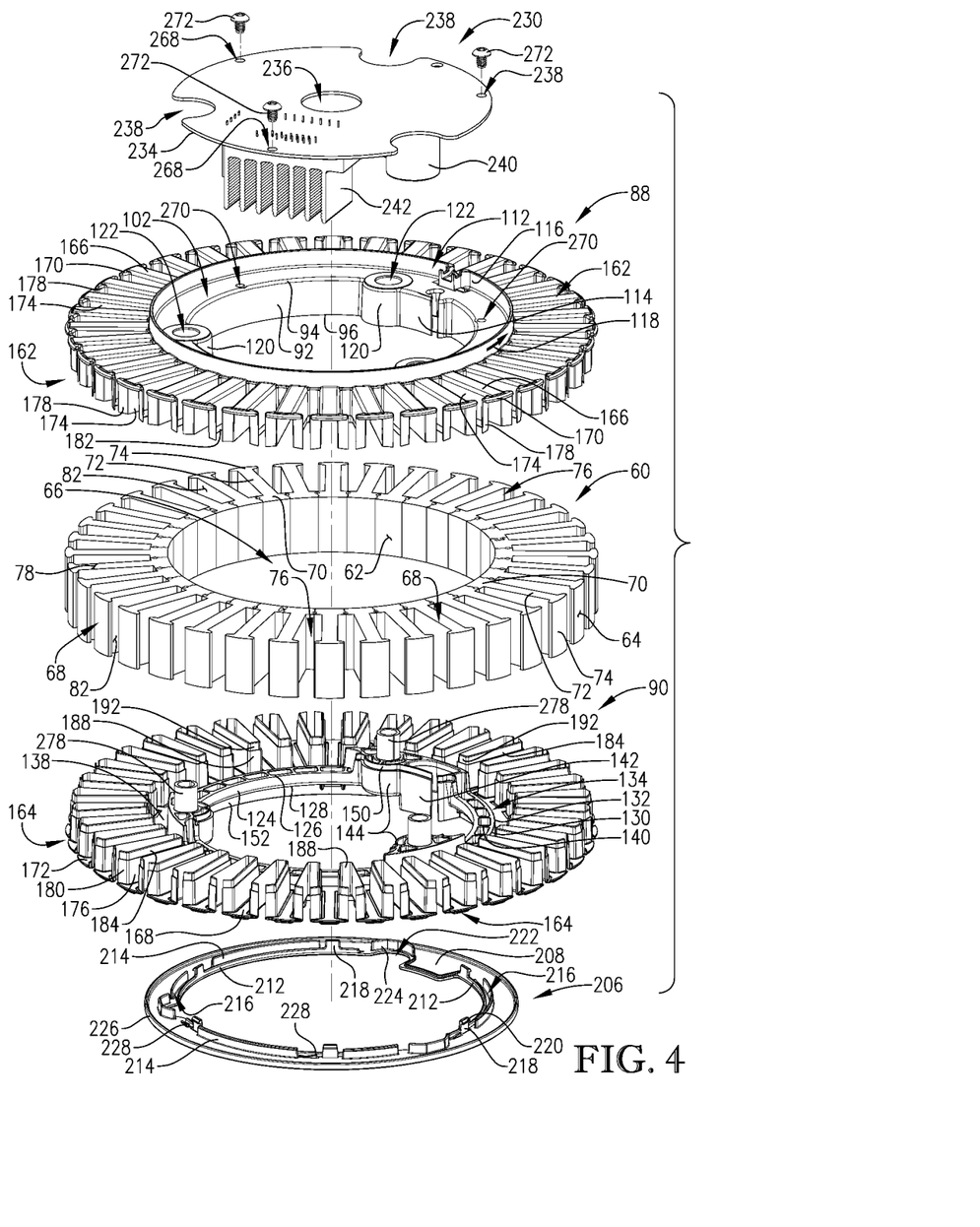
FIG. 4 is an exploded, partial sectional top perspective view of a portion of the machine of FIGS. 1-3, particularly depicting the control board assembly mounting means and the stator core insulation means.
Figure 5:
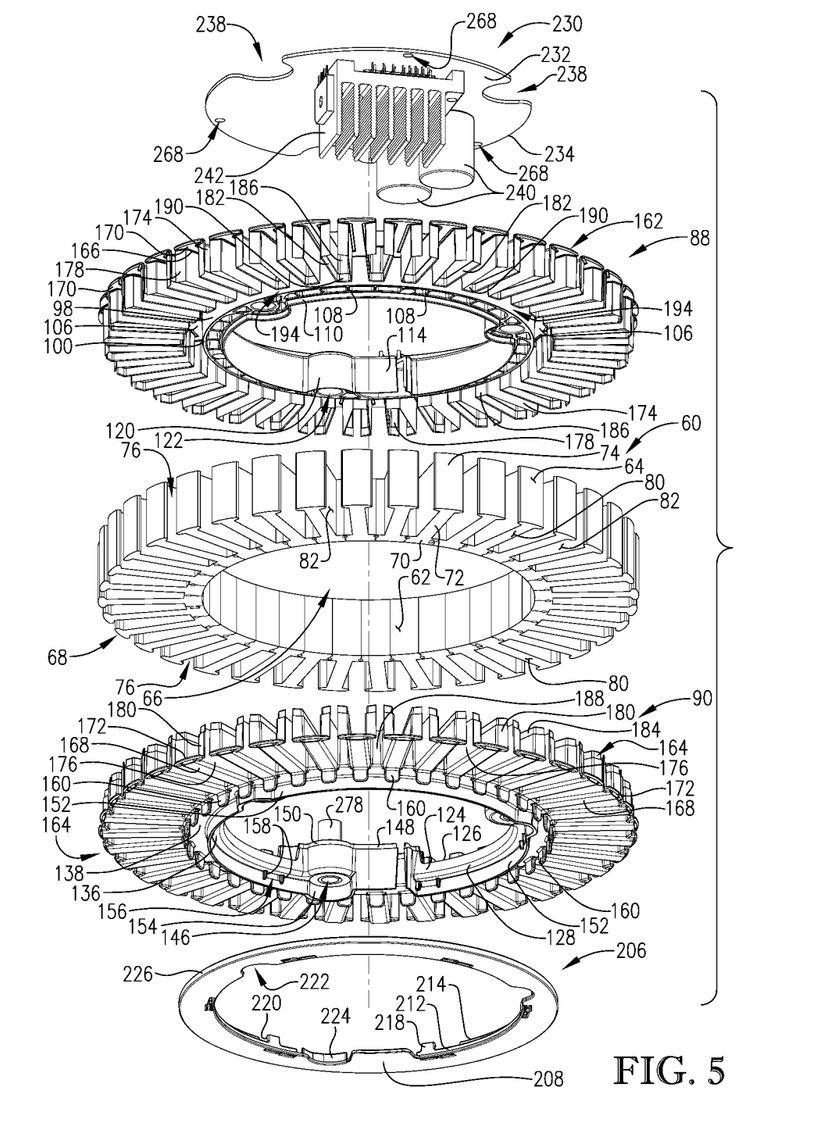
FIG. 5 is an exploded, partial sectional bottom perspective view of the portion of the machine shown in FIG. 4.

As best shown in FIGS. 4 and 5, the stator 18 includes a generally toroidal core 60. In a preferred embodiment as shown, the core 60 presents radially inner and outer circumferential faces 62 and 64, respectively, with the inner face 62 defining a central aperture 66. Furthermore, the core 60 preferably includes a plurality of radially projecting teeth 68, each of which comprises a yoke 70, an arm 72, and a crown 74. The yokes 70 are interconnected and collectively present the inner circumferential face 62, while the arms 72 and the crowns 74 are arcuately spaced apart to define slots 76 therebetween. Each tooth 68 preferably presents an upper face 78, a lower face 80, and two side faces 82, although alternative tooth shapes are permissible within the scope of the present invention. The crowns 74 of the teeth 68 collectively present the outer circumferential face 64, which is thus discontinuous.

Although a perfectly annular core 60 having circular inner and outer surfaces as shown falls under the descriptor "generally toroidal" as used herein, "generally toroidal" shall not be limited to the core shape described above but instead be interpreted to include any suitable shape having a central opening. According to certain aspects of the invention, for instance, the inner and/or outer surfaces could be polygonal in shape. It is also possible for the stator core not to extend continuously circumferentially. For instance, the stator core could alternatively be sectioned or have segments removed.

The stator core 60 preferably comprises a ferromagnetic material such as steel and is preferably a laminated structure. However, it is within the ambit of the invention for the core 60 to comprise an alternative material and be of an alternative structure. For instance, the core 60 could be integrally formed, be composed of iron, include a continuous annular base ring from which the teeth 68 project, or feature a combination of these or other variations known to one skilled in the art.

The stator 18 additionally comprises coils 84 (FIGS. 2 and 3) that comprise electrically conductive wiring 86 wound multiple times around each individual tooth 68. The wiring 86 preferably substantially comprises a plurality of electrically conductive wires. Copper wires are preferred, although it is within the scope of the present invention to use other types of wires such as aluminum. The wires may or may not be provided with coatings. (In the illustrated embodiment, the coils 84 are shown only schematically and have been removed from all or a plurality of the teeth 68 in some figures for the sake of clarity. However, in practice, the coils 84 would be found on each tooth 68 and would comprise multiple windings of the wiring 86.) As is customary, the wiring 86 is wound around the teeth 68 in a particular pattern according to phasing of the motor 10.

Upper and lower insulating mounting caps 88 and 90, respectively, are fixed to the stator 18. The caps 88,90 cooperatively provide mounting structure configured to fix the caps 88,90 to the machine 12, such that the stator 18 is fixed to and supported on the machine 12 by the mounting caps 88 and 90. The caps 88,90 also provide insulating structure for insulating the stator core 60 from the coils 84. Even further, the caps 88,90 provide means for management of the wiring 86. The structure associated with each of these three functions is discussed below.

In a preferred embodiment best illustrated in FIGS. 2, 4, and 5, the upper mounting cap 88 includes an inner circumferential wall 92 having upper and lower edges 94 and 96, respectively, and an outer circumferential wall 98 having a lower edge 100. A shelf 102 is provided that has a bridge portion 104 that extends radially outwardly from the upper edge 94 so as to connect the inner and outer circumferential walls 92 and 98, respectively, and, as best shown in FIG. 2, a yoke portion 106 that extends radially outwardly beyond the outer circumferential wall 98. A plurality of support ribs 108 extend between the inner and outer circumferential walls 92 and 98, respectively. The inner lower edge 96 extends past the ribs and lower outer edge 100 so as to form a substantially continuous circumferential lip 110. Wire routing structure 112, including an upper wiring receiver portion 114 and a circumferential retaining wall 116 extending axially upwardly from the yoke portion 106 of the shelf 102, is provided as well. An arcuately extending wiring pathway 118 is defined around the retaining wall 116. Also formed in the upper mounting cap 88 are a plurality of radially inwardly extending upper mounting boss portions 120, each defining an opening 122 therethrough.

In a preferred embodiment best illustrated in FIGS. 2, 4, and 5, the lower mounting cap 90 includes an inner circumferential wall 124 having upper and lower edges 126 and 128, respectively, and an outer circumferential wall 130 having an upper edge 132. A lower wall 134 is provided that has a bridge portion 136 that extends radially outwardly from the lower edge 128 so as to connect the inner and outer circumferential walls 124 and 130, respectively. As best shown in FIG. 2, the lower wall 134 also includes a yoke portion 138 that extends radially outwardly beyond the outer circumferential wall 98. A plurality of support ribs 140 extend between the inner and outer circumferential walls 124 and 130, respectively. A lower wiring receiver portion 142 is provided, as well. Also formed in the lower mounting cap 90 are a plurality of radially inwardly and axially upwardly extending lower mounting boss portions 144, each defining an opening 146 therethrough. The wiring receiver portion 142 and the mounting boss portions 144 of the lower mounting cap 90 include constricted regions 148 and 150, respectively.

A circumferential skirt 152 extends axially downwardly from the bridge portion 136 of the lower wall 134 and includes a plurality of curved regions 154. Furthermore, a plurality of recesses 156 flanked by guides 158 are formed in the skirt 152. A plurality of circumferentially spaced tabular projections 160 extend axially downwardly from the yoke portion 138 of the lower wall 134. Both the circumferential skirt 152 and the tabular projections 160 will be discussed in more detail below.

As briefly noted above, in a preferred embodiment, the mounting caps 88,90 are additionally configured for insulation of the stator core 60 from the coils 84. To this end, the mounting caps 88,90 are preferably composed of a synthetic resin material and include structure designed to cover selected portions of the stator core 60. For instance, each cap 88,90 preferably includes a plurality of respective upper and lower insulative tabs 162,164 extending radially outwardly from the respective yoke portions 106,138. In a preferred embodiment, each tab 162 or 164 includes a respective arm portion 166 or 168, a crown portion 170 or 172, and side portions 174 or 176, with each side portion 174 or 176 including an associated flared side crown portion 178 or 180. Each upper side portion 174 also includes a connection portion 182, while each lower side portion 176 includes a connection portion 184.

An interconnecting portion 186 or 188 including a flanged connection portion 190 or 192 is provided between each tab 162 or 164, respectively (see FIGS. 4 and 5). As best shown in FIG. 5, a circumferentially extending upper channel 194 is defined between the yoke portion 106 of the shelf 102, the outer circumferential wall 98, and the interconnecting portions 186 associated with the upper mounting cap 88. Similarly, as shown in FIG. 4, a circumferentially extending lower channel 196 is defined between the yoke portion 138 of the lower wall 134, the outer circumferential wall 98, and the interconnecting portions 188 associated with the lower mounting cap 90.

In an exemplary but not limiting method of assembly of the stator 18 and mounting caps 88 and 90, the upper mounting cap 88 is placed on the stator core 60 such that an upper portion of each yoke 70 of each tooth 68 of the stator core 60 is received within the upper channel 194. The lower mounting cap is placed on the stator core 60 such that a lower portion of each yoke 70 of each tooth 68 of the stator core 60 is received within the lower channel 196. Furthermore, the constricted regions 148 and 150 of the lower wiring receiving portion 142 and lower mounting boss portions 144 are received within the circumferential lip 110 of the upper mounting cap 88. The mounting boss portions 120 and 144 thus form mounting bosses 198 (FIG. 3), with each mounting boss 198 defining an opening 200 (the opening 200 being the combination of openings 122 and 146) therethrough. Furthermore, the connection portions 184 and 192 of the side portions 176 and interconnecting portions 188 of the lower cap 90 interengage with the connection portions 182 and 190 of the side portions 174 and interconnecting portions 186 of the upper cap 88 such that the teeth 68 are received in respective tooth-receiving spaces 202. The wiring 86 can then be wound around the teeth 68 and the associated tabs 162 and 164 such that the wiring 86 passes through the slots 76 defined between the teeth 68 and forms a plurality of coils 84. The above-described assembly including the stator 18, the mounting caps 88 and 90, and the coils 84 will be referred to hereinafter as the stator assembly 204.

Although the insulative tabs 162 and 164 used in the preferred embodiment described above are integral with the mounting caps 88 and 90, it is within the scope of the present invention for stator core insulating means to be provided that are partly or entirely independent of the caps 88 and 90. For instance, mounting caps might be used to insulate the inner circumferential face 62 and upper and lower faces 78 and 80 of the yokes 70 of the teeth 68 of the stator core 60, while independent tabular components might insulate appropriate remaining surfaces of the teeth 68. Alternatively, the stator core 60 might be at least partly coated with an electrically insulative coating, preferably a powder coating. One suitable powder coating material is available from 3M™ under the designation Scotchcast™ Electrical Resin 5555. However, it is within the scope of the present invention for the stator core 60 to be insulated with other electrically insulative coatings (or low profile means that permit larger coils), as well as insulation arrangements that cover the core 60 to a lesser or greater degree than that shown. Furthermore, it is noted that certain insulation approaches might enable the complete exclusion of one or both mounting caps and/or the insulative tabs.

In a preferred embodiment, a cover 206 is provided for attachment to the lower mounting cap 90. As best shown in FIGS. 4 and 5, the cover 206 is preferably annular in form and includes several structures configured for interaction with corresponding structures on the lower mounting cap 90. For instance, the cover 206 preferably includes a floor 208 that cooperates with the wiring receiver portions 114 and 142 to form a wiring receiver 210 (FIGS. 1 and 2). Inner walls 212 and outer walls 214 define a discontinuous circumferentially extending slot 216 configured to receive the circumferential skirt 152 such that relative radial movement between the cover 206 and the lower mounting cap 90 is restricted. Latches 218 having catch portions 220 extend from the inner walls 212 and are configured to engage the recesses 156 formed in the circumferential skirt 152, with the catch portions 220 preventing relative axial movement and the interaction of the latches 218 with the guides 158 preventing rotational movement between the cover 206 and the lower mounting cap 90 when the latches 218 are engaged. Recesses 222 are formed in the cover 206 to correspond to the mounting bosses 198, and curved walls 224 provided adjacent the recesses 222 are configured to encompass the corresponding curved regions 154 of the skirt 152. An elevated rim 226 is configured to encircle the tabular projections 160 of the lower mounting cap 90. Finally, a plurality of triangular nubs 228 are provided to further engage the lower cap 90. Although the above description discloses a preferred embodiment of the cover 206, it is within the scope of the present invention for variations to be made to the structural components or for the cover 206 to be excluded entirely.

A control board assembly 230 including a base 232 is provided. In a preferred embodiment, the base 232 is generally annular in form so as to define a generally circular outer perimeter 234 and a general circular interior opening 236. Preferably, the opening 236 is configured such that the rotor shaft 20 can pass therethrough. Furthermore, in a preferred embodiment, a plurality of recesses 238 are formed in the base 232 to correspond to the mounting bosses 198, as will be discussed in more detail below.

The base 232 preferably extends continuously about the opening 236 so as to completely circumscribe the shaft 20, but it is within the scope of the present invention for the base 232 to extend fewer than 360 degrees so as to be non-continuous about the opening 236 and to thus only partially circumscribe the shaft 20. Furthermore, although the control board assembly 230 preferably has a generally circular perimeter 234 and opening 236, "generally annular" is not meant to limit the shape to one having a circular perimeter and circular opening. Rather, "generally annular" as used herein shall be interpreted to include any suitable shape having a central opening. According to certain aspects of the invention, for instance, a board could be provided with an opening that varies in shape from that of the perimeter, or the board could be sectioned or have segments removed.

In a preferred embodiment, one or more electronic components 240 are mounted on the base 232. Preferably, the control board assembly 230 controls one or more operational aspects of the motor 10 through use of at least one of the one or more electronic components 240. For instance, in one aspect of the invention, the control board assembly 230 might be used to control the rotational speed or direction of the motor 10 and, in turn, the washer basket of the machine 12. In another aspect of the invention, the control board assembly 230 might include temperature sensors operable to indicate overheating of the control board assembly 230. If desired, the control board assembly 230 may also be coupled with the machine 12 to respond to machine conditions and thereby control the motor 10 or other machine components. For example, the control board assembly 230 might provide signals pertaining to control of the temperature of a fluid carried in the washer basket of the machine 12. In yet another aspect of the invention, the control board assembly 230 might receive signals pertaining to current liquid levels in the agitator basket of the machine 12 and provide signals pertaining to filling and draining of liquid in response to the signals that were received. Furthermore, it is preferable that a heat sink element 242 be mounted on the base 232 to assist in cooling of the control board assembly. However, it is within the scope of the present invention for the base 232 to have any suitable components, whether electronic or not, or even no components at all mounted thereon. In addition, although the base 232 is a printed circuit board in a preferred embodiment, the base 232 may be configured in any suitable manner without departing from the spirit of the present invention.

As noted previously, it is preferred that a heat sink element 242 be provided for cooling of the control board assembly 230. It is also preferable that the rotor can 26 be used for additional cooling of the control board assembly 230. More particularly, the spoked base 38 of the rotor can 26 preferably comprises a plurality of spokes 244 and a peripheral ring 246 that cooperatively define a plurality of ventilation openings 248 and present an inner surface 250 and an outer surface 252. As best shown in FIG. 6, a plurality of elevated vanes 254 extend radially along the inner surface 250 and are connected by inner and outer elevated rings 256 and 258, respectively. Similarly, a plurality of elevated vanes 260 extend radially along the outer surface 252 and are connected by inner and outer elevated rings 262 and 264, respectively. A plurality of blades 266 project from the tops of the vanes 254 of the inner surface 250 such that the blades 266 effectively extend radially along the inner surface 250 and axially from the inner surface 250 toward the control board assembly 230. Although it is preferable that structures similar to vanes 254 and 260 and rings 256, 258, 262, and 264 are provided, such structures may be excluded from the rotor can 26 without departing from the scope of certain aspects of the present invention.

Upon rotation of the rotor 16 and therefore the rotor can 26, the blades 266 are operable to disturb adjacent air, such that the rotor can 26 is operable as a fan. The blades 266 are proximal to the control board assembly 230 when the motor 10 is assembled as illustrated in a preferred manner shown in FIGS. 1 and 2, so the blades 266 are operable to disturb air adjacent the control board assembly 230 and, more particularly, adjacent the electronic components 240 and the heat sink element 242 that are preferably carried on the base 232. The resulting air movement acts to transfer heat away from the control board assembly 230, thereby enabling more efficient cooling than would be effected by the heat sink element 242 alone. Warm air may escape from the region adjacent the control board assembly 230 by passing through the ventilation openings 248, while cooler air may be drawn in through the ventilation openings 248.

Although in a preferred embodiment, both a heat sink element 242 and a plurality of blades 266 are provided, it is within the scope of certain aspects of the present invention for either or both to be excluded. Furthermore, it is noted that in instances in which both a heat sink element 242 and a plurality of blades 266 are provided, the advantages provided by the blades may enable use of a smaller or less expensive heat sink. Similarly, electronic components that would be unusable with a conventional cooling configuration might be acceptable if the dual cooling means described herein are implemented.

In a preferred method of mounting the control board assembly 230 onto the stator assembly 204, the base 232 is placed on the bridge portion 104 of the shelf 102 of the upper mounting cap 88. Preferably, the base 232 is oriented such that the recesses 238 formed therein correspond to the upper mounting boss portions 120 and such that a plurality of fastener-receiving openings 268 formed through the base 232 align with a corresponding plurality of fastener-receiving openings 270 formed through the bridge portion 104 of the shelf 102. A plurality of screws 272 are then inserted through the respective openings 268 and 270 to secure the base 232 to the upper mounting cap 88. However, it is with the scope of the present invention for any one of a variety of fixation means to be implemented, including, for instance, use of adhesives or thermal bonding.

In a preferred embodiment as illustrated, the control board base 232 is mounted on the shelf 102 such that any electronic component 240 or heat sink element 242 mounted thereon extends downwardly into the aperture 66 defined by the stator core 60. However, it is within the scope of the present invention for the control board base 232 to be mounted adjacent the opposite (lower) side of the core 60 and for any electronic component 240 or heat sink element 242 mounted thereon to extend upwardly into the aperture 66. Furthermore, although the illustrated embodiment shows the shelf 102 positioned slightly axially outside the aperture 66 so as to be adjacent the upper faces 78 of the teeth 68 of the stator core 60, it is with the ambit of the present invention for the shelf 102 to be positioned entirely within the aperture 66 such that the base 232 and any associated heat sink element 242 or electronic component 240 are positioned within the aperture 66.

In a preferred method of mounting of the motor 10 on the machine 12, the stator assembly 204 is mounted on the tub mounting hub 58. More particularly, the tub mounting hub 58 includes a plurality of stator mounting extensions 274, each of which presents a constricted region 276 at one end. Each constricted region 276 is received within the opening 122 of the respective upper mounting boss portion 120 so as to abut a respective bushing 278 (FIGS. 3-5) received within the opening 200 of the respective mounting boss 198. A fastener (not shown) is cooperatively received within the bushing 278 and the constricted region 276 of the mounting extension 274, thereby connecting the mounting caps 88,90 to the tub mounting hub 58 and, as a result, mounting the stator 18 on the machine 12. The bushings 278 and fasteners also serve to additionally secure the mounting caps 88 and 90 to each other.

In a preferred embodiment, the upper and lower mounting bosses 120,144 are spaced equally about the inside circumferences of the mounting caps 88,90 so as to help distribute loads when the mounting caps 88,90 are fixed to the machine 12 to support the other motor components. However, it is within the scope of the present invention for the mounting caps 88,90 to include alternative mounting structures that may or may not incorporate the bushings 278, the fasteners, and/or the mounting bosses 198 and that may or may not interact with the stator mounting extensions 274. Similarly, the stator mounting extensions 274 might be embodied differently or excluded entirely. It also acceptable for any mounting-related structures that are provided to be spaced in any suitable manner. Furthermore, in contrast to the dual mounting cap structure embodiment described herein, a single mounting cap might be used; or mounting caps might be done away with entirely in lieu of either mounting structure integral to the tub or conventional mounting structure utilizing fasteners inserted through an enlarged stator core.

In operation of the preferred machine embodiment shown in FIG. 1, the control board assembly 230 acts as a signal processor, receiving signals from the user interface and any suitable sensors associated with the machine 12; processing the signals; and transmitting appropriate signals in response. For instance, the control board assembly 230 might transmit or allow transmittal of an electrical signal from a power source (not shown) through the wiring 86. When the signal is received, the coils 84 energize the stator core 60, and the stator poles corresponding to each tooth 68 interact with the permanent magnets 46 of the rotor 16 to induce rotation of the rotor 16, as well as the rotatable agitator or washer basket (not shown) of the machine 12. Concurrent with rotation of the rotor can 26, the blades 266 disturb the air adjacent the control board assembly 230 to provide a cooling effect. The tub 14, the tub mounting hub 58, and the stator assembly 204 remain stationary.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An outer rotor motor for use in a machine, said motor comprising:
   a rotor rotatable about an axis;
   a stator spaced at least in part radially inside the rotor,
   said stator including a generally toroidal core and wiring wound around the core such that the stator takes a generally toroidal form;
   a control board assembly being configured to control at least one operational characteristic of the motor,
   said control board assembly mounted at least in part radially inside the stator to be at least substantially circumscribed by the stator,
   said control board assembly including
      a base, and
      an electronic component supported on the base and positioned at least in part radially inside the stator; and
   insulating structure configured to insulatively cover at least part of the core,
   said insulating structure defining a shelf,
   said control board assembly being affixed to the shelf.

2. The motor as claimed in claim 1,
   said rotor including a shaft,
   said base being generally annular base and defining a central opening, said shaft passing through the central opening such that the control board assembly at least substantially circumscribes the shaft.

3. The motor as claimed in claim 2,
said base being continuous to completely and endlessly circumscribe the shaft.

4. The motor as claimed in claim 1,
said control board assembly including a heatsink element mounted on the base.

5. The motor as claimed in claim 1,
said insulating structure configured to support the stator and fix the stator to the machine.

6. The motor as claimed in claim 1,
wherein a plurality of screws affix the control board assembly to the insulating structure.

7. The motor as claimed in claim 1,
said stator core presenting an end face and a central aperture extending from the end face,
said shelf being adjacent the end face.

8. The motor as claimed in claim 7,
said control board assembly including a plurality of said electronic components,
said base being placed against the shelf,
said electronic components extending from the base into the central aperture.

9. The motor as claimed in claim 1,
said insulating structure taking a generally toroidal form,
said control board assembly being affixed at least in part radially inside the insulating structure to be at least substantially circumscribed by the insulating structure.

10. The motor as claimed in claim 5,
said insulating structure comprising a pair of mounting caps located generally inside the stator, wherein the mounting caps are positioned relative to the stator such that relative rotation between the stator and the mounting caps is prevented.

11. The motor as claimed in claim 10,
said stator core including a plurality of teeth that are at least in part spaced arcuately from one another,
each of said teeth including an upper surface and a lower surface,
a first one of said mounting caps including a plurality of first tabs corresponding to the teeth and covering the corresponding upper surfaces,
a second one of said mounting caps including a plurality of second tabs corresponding to the teeth and covering the corresponding lower surfaces.

12. The motor as claimed in claim 11,
said wiring being wound around the teeth and the first and second tabs.

13. The motor as claimed in claim 11,
each of said teeth including a pair of side surfaces,
each of said side surfaces being cooperatively covered by corresponding ones of the first and second tabs.

14. The motor as claimed in claim 5,
said insulating structure comprising an electrically insulative material, whereby the mounting structure is operable to electrically insulate the stator core.

15. The motor as claimed in claim 14,
said insulating structure and said stator core comprising dissimilar materials.

16. The motor as claimed in claim 15,
said insulating structure comprising a synthetic resin material,
said stator core comprising a metal material.

17. The motor as claimed in claim 5,
said insulating structure including—
a wiring outlet at which the wiring converges for connection to a power source, and
wire routing structure configured to facilitate routing of the wiring to the wiring outlet.

18. The motor as claimed in claim 17,
said wire routing structure defining a wiring pathway projecting generally from the wiring outlet and extending along the core.

19. The motor as claimed in claim 18,
said wire routing structure including an axially projecting wall that extends arcuately about the stator core.

20. The motor as claimed in claim 1,
said rotor including a rotor can and a plurality of permanent magnets supported by the rotor can in a radially outward spaced relationship about the stator.

21. The motor as claimed in claim 20,
said rotor can including a plurality of projections operable to disturb air adjacent the control board assembly when the rotor is rotated.

22. The motor as claimed in claim 21,
said rotor can including a radially extending inner face adjacent the control board assembly,
said projections extending radially along the inner face and from the inner face toward the control board assembly.

23. The motor as claimed in claim 22,
said projections being evenly arcuately spaced from one another.

24. The motor as claimed in claim 1,
said stator core including a plurality of teeth cooperatively defining a single, unobstructed central aperture.

25. The motor as claimed in claim 1,
said shelf extending at least partly around the axis and presenting an at least substantially radially extending support face,
said base engaging the support face so as to be supported by said shelf.

26. The motor as claimed in claim 25,
said shelf presenting a continuous annular shape.

* * * * *